Dec. 15, 1936.   D. F. W. COFFEY   2,063,985
APPARATUS FOR MAKING A COMPOSITE STEREOGRAPH
Filed May 24, 1935    4 Sheets-Sheet 1
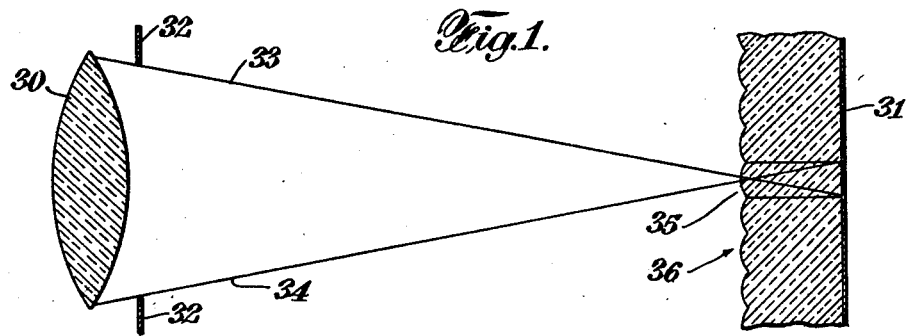
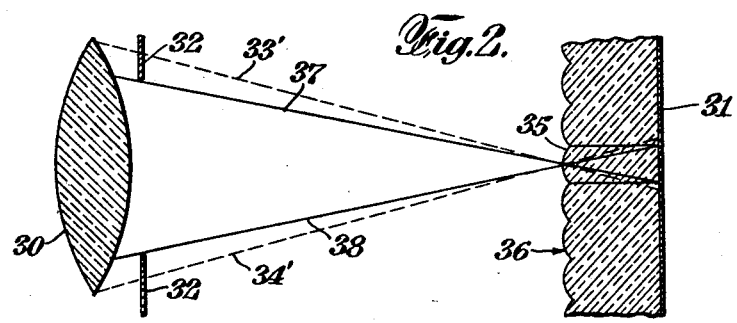
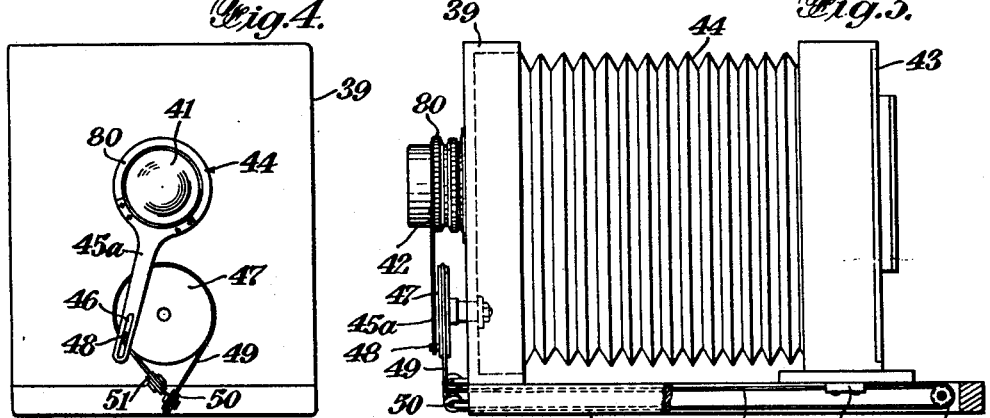
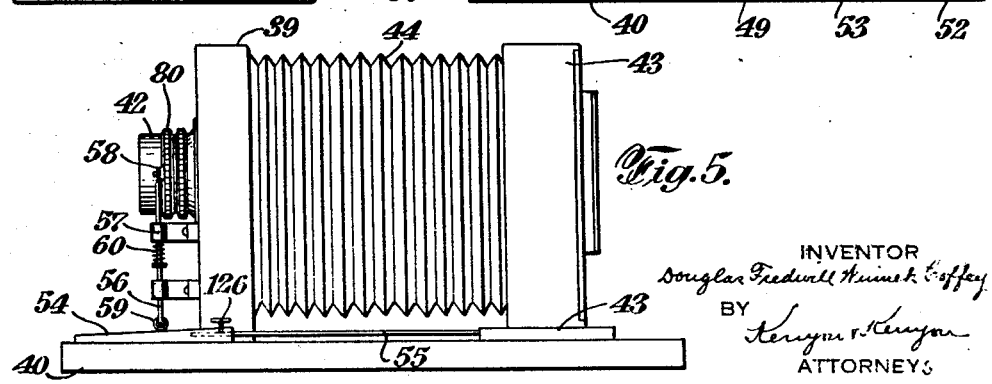
INVENTOR
Douglas Frederick Heinrich Coffey
BY
Kenyon & Kenyon
ATTORNEYS

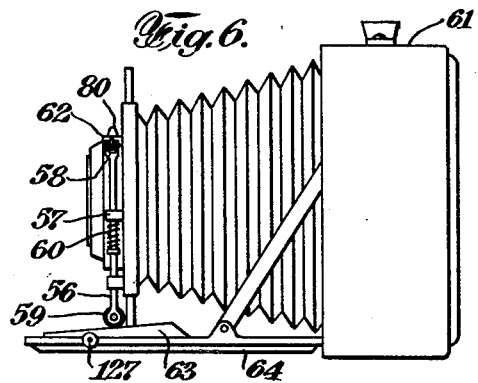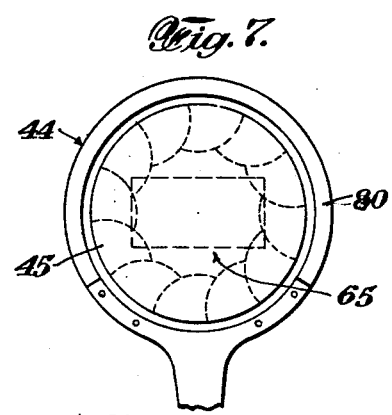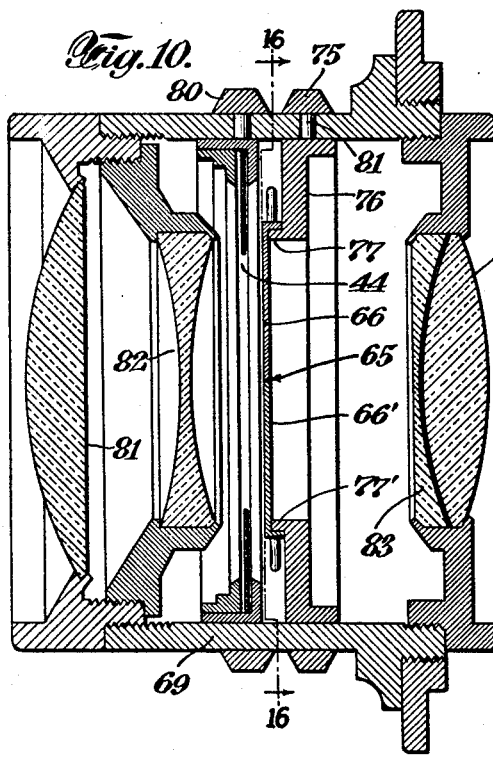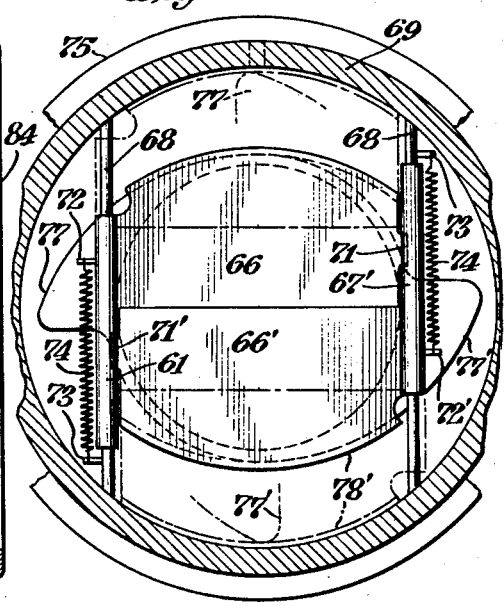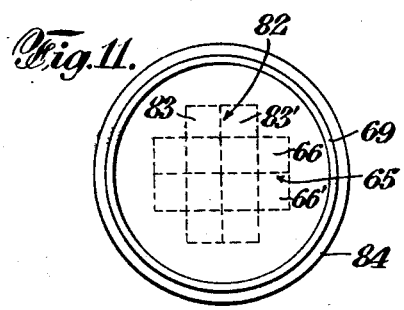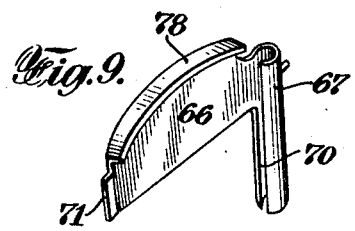

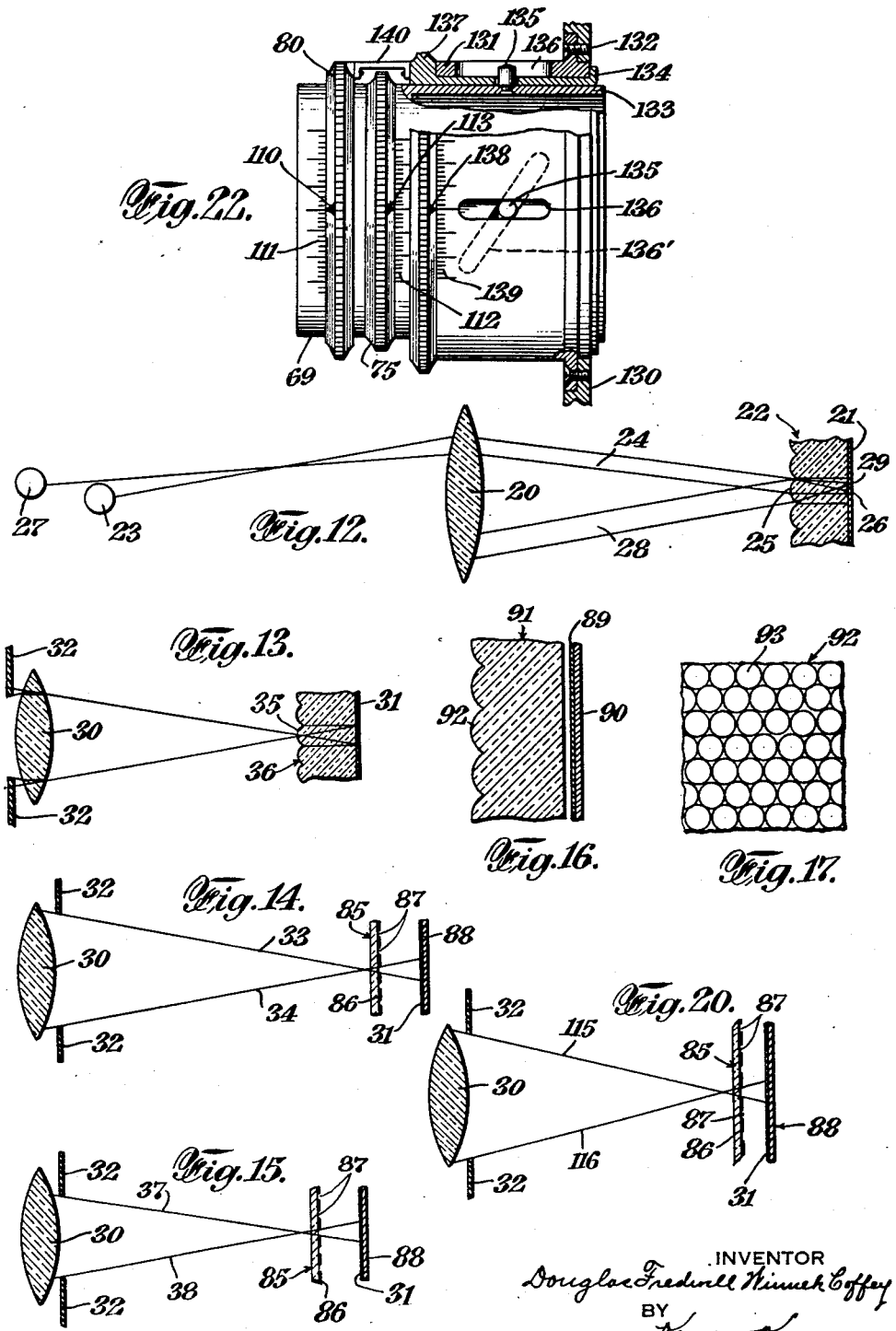

Dec. 15, 1936.  D. F. W. COFFEY  2,063,985
APPARATUS FOR MAKING A COMPOSITE STEREOGRAPH
Filed May 24, 1935  4 Sheets-Sheet 4
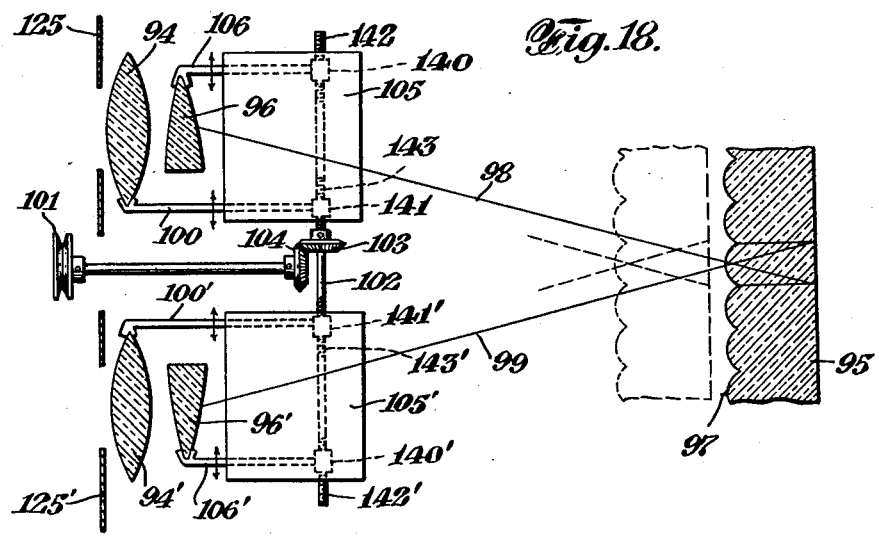
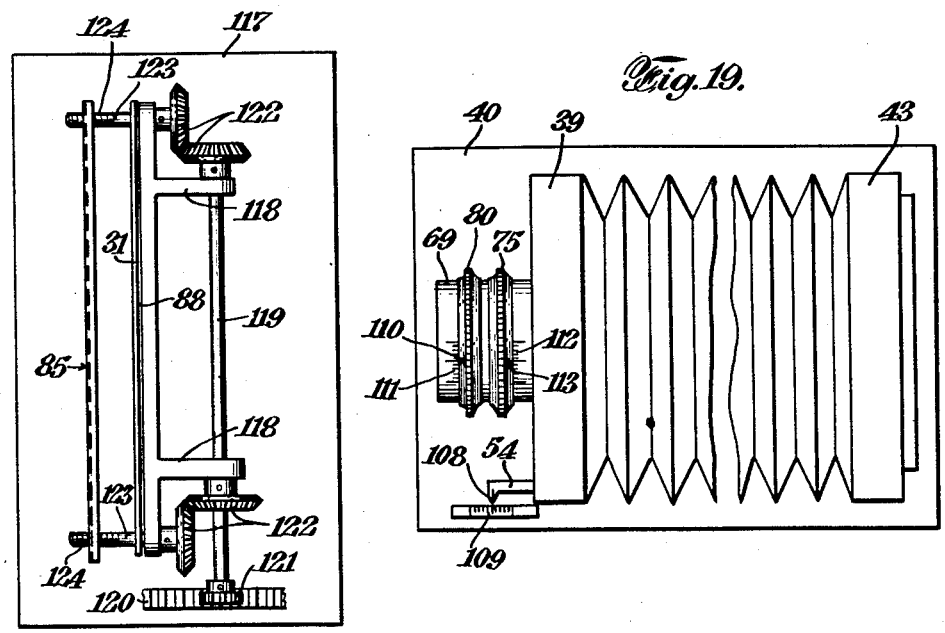

Patented Dec. 15, 1936

2,063,985

UNITED STATES PATENT OFFICE 2,063,985

APPARATUS FOR MAKING A COMPOSITE STEREOGRAPH

Douglas Fredwill Winnek Coffey, New York, N. Y., assignor to Winnek Stereoscopic Processes, Incorporated, Wilmington, Del., a corporation of Delaware Application May 24, 1935, Serial No. 23,201

23 Claims. (Cl. 95—18)

This invention relates to the production of pictures which are viewable in stereoscopic relief. This invention relates particularly to the making of composite stereographs, namely, pictures composed of a plurality of elements which are independent portions of different views of a photographed subject and which when viewed with a suitable viewing screen bring one view to one eye of the observer and another view to another eye of the observer in a way analogous to that in which objects appear to a person with normal binocular vision and with resulting effect of stereoscopic relief.

In order to view any object in stereoscopic relief, the object must be simultaneously viewed from two points of view. When a person with normal binocular vision focuses his eyes upon an object, each of his eyes sees the object from a different point of view due to the spacing apart of the eyes, which spacing is usually about 2½ inches. Moreover, each of the eyes sees the object in a different relation to objects in the foreground and objects in the background. The brain fuses the different images formed in the two eyes and an impression of stereoscopic relief is obtained. To obtain stereoscopic relief by photographic methods it is necessary to photograph a right eye view of an object or scene and a left eye view of the same object or scene and bring these two views separately to the separate eyes of the observer.

One of the devices heretofore devised for obtaining the impression of stereoscopic relief was the stereoscope. In using the stereoscope two different views of an object are made and each of the views as a whole is viewed separately by each eye of the observer through a special viewing device held before the eyes.

It has also been proposed to pass light received from two different viewing points of an object through a line grating or the like so as to cause a plurality of elements of each view to fall separately on a photographic film. A viewing device such as a grating can then be placed over the picture thus made, and the grating will cause the light from the elements forming one view of the object to be directed to one eye of the observer and light from the other view of the object to be directed to the other eye of the observer. In such case the theory is that each eye will see only its own view of the object and that a stereoscopic effect will be obtained.

While such methods of making composite stereographs have been known, numerous difficulties have been encountered which up to the present time have prevented stereoscopic photography passing beyond the stage of an interesting experiment. The visibility of the viewing device, the blurring of images, the production of pseudoscopic effects, and the failure to get satisfactory stereoscopic relief, etc. have occasioned difficulties which have heretofore prevented extensive commercial exploitation in the field of stereoscopic photography.

It is an object of this invention to remove some of the difficulties above mentioned.

Purposes and features of this invention relate to light-control means such as light valves for controlling the angle at which marginal rays pass through resolving elements of a resolving screen in making a composite stereograph. Further purposes and features relate to automatic control of such light-control means. Further purposes and features relate to such light-control means in combination with further means for controlling light intensity admitted into the camera and for adjusting the depth of focus that can be obtained with the camera and to the last-named means per se. Further purposes and features relate to such light-control means adapted for making stereographs that can be viewed in relief from any angle. Further purposes and features relate to light-control devices as above mentioned adapted for use in combination with a large diameter lens. Further purposes and features relate to light-control means of the character referred to for use in binocular cameras. Further purposes and features of this invention relate to means for accurately controlling and adjusting said light-control means so that maximum stereoscopic effects are produced under varying conditions.

Further features, objects and advantages of this invention will be apparent from the following description of certain illustrative embodiments shown in the accompanying drawings, wherein—

Fig. 1 is a sectional diagrammatic view of one type of optical arrangement which may be employed according to this invention;

Fig. 2 is a similar view of the apparatus shown in Fig. 1 with the parts in another position;

Fig. 3 is a side view of a camera embodying one form of light-control device according to this invention;

Fig. 4 is a front view of the camera shown in Fig. 3;

Fig. 5 is a side view of a camera having a modified form of light-control device;

Fig. 6 is a side view of a camera having a further modified form of light-control device;

Fig. 7 is a front detail view of a conventional form of adjustable iris which can be used in connection with one embodiment of this invention;

Fig. 8 is a front view of a second light-control device;

Fig. 9 is a perspective view of one of the parts of the light-control device shown in Fig. 8;

Fig. 10 is a side-sectional view of a composite lens including light-controlling devices according to this invention;

Fig. 11 is a diagrammatic front view of a camera equipped with two light valves at right angles to each other according to another modification of this invention;

Fig. 12 is a diagrammatic optical drawing illustrating the paths of light rays in making one form of stereograph;

Fig. 13 is a view similar to Fig. 2 with the light valve located in a different position;

Fig. 14 is a diagrammatic plan view of apparatus for making a stereograph utilizing a grating;

Fig. 15 is a similar view of the apparatus shown in Fig. 14 with the parts in a different relative position to each other;

Fig. 16 is a top sectional view of a modified form of lenticular screen and film;

Fig. 17 is a front view of a modified form of lenticular screen;

Fig. 18 is a diagrammatic plan view partly in section of a modified form of apparatus for producing stereographs with light-control arrangement;

Fig. 19 is a plan view of an alternate form of camera having adjustable light-controlling apparatus;

Fig. 20 is a diagrammatic plan view of an alternate form of apparatus employing a grating for obtaining light-control on the image screen;

Fig. 21 is a plan view showing detail of apparatus for producing relative movement between the resolving and image screens; and Fig. 22 is a plan view showing part of an alternate form of apparatus having light-control devices in a camera wherein the lens mounting is moved relatively to the front of the camera.

In Fig. 12 there is shown diagrammatically photographic apparatus which illustrates some of the underlying principles used in making one type of composite stereograph. The apparatus comprises a lens 20, a photographic emulsion 21 and a resolving screen 22. In Fig. 12 emulsion 21 is shown as being disposed upon the rear plane surface of the material out of which the resolving screen 22 is made. The lens 20 has a large working diameter. For example, the lens 20 has a diameter of about 2½ inches or over. Preferably the diameter of lens 20 is approximately 7½ inches. A lens having a large diameter has the property of "looking around" an object. Thus, if the eyes of an individual were placed at the position of the lens 20, the eyes would receive light reflected from object 23 from two different points of view. It is therefore apparent that the large lens 20 is adapted to receive light at viewing points spaced apart by the normal pupillary distance and even at points spaced further apart if a sufficiently large lens is used.

In a camera of usual type wherein no resolving screen is used, the light received by the camera lens is brought to a common focus on a photographic emulsion and the left and right views are merged with one another so that no stereoscopic effect is produced upon viewing the photograph even though a large lens is used. The presence of a suitable resolving screen, however, causes the spaced views of an object to fall separately upon the photographic emulsion.

In Fig. 12 a beam 24 of parallel rays is shown which emanates from one side of lens 20 and falls on one of the lenses 25 of the lenticular resolving screen 22. In passing through the lens 25 the beam 24 is converged to a narrow image portion 26 on emulsion 21. The rays which make up the beam 24 come from light reflected from objects 23 and 27, for example, and the optical relationship is such that object 23 is focussed on the emulsion 21. The light from 27 is not in sharp focus and serves as a background for object 23. Another beam of parallel rays 28 is likewise shown which comes from a different part of lens 20 that is separated, for example, by approximately 2½", from the part of lens 20 from which the beam 24 emanates. The beam 28 in passing through the resolving screen is likewise converged to a narrow band 29 and it is to be noted that the band is separate and distinct from the band 26 on emulsion 21. It is apparent, therefore, that the different views of objects, such as objects 23 and 27, are imaged separately from each other on the emulsion 21 due to the action of the resolving screen 22. Similarly, other beams of light from different portions of the lens 20 will also be separately imaged in the form of a plurality of image elements arranged as a panoramogram on the emulsion 21. When the emulsion is developed and the photographed image elements therein are viewed through a suitable viewing screen such as a screen similar to the screen 22, the light from the separate image bands or elements on the photographic emulsion will be directed at different angles so that all of the elements belonging to one view of the object will be visible to one eye only while the elements of another view of the object will be visible to the other eye only. If the right view is seen by the right eye only and the left view is seen by the left eye, stereoscopic relief is obtained.

While the lens means above described for receiving spaced views of an object and imaging them on an image screen such as a photographic emulsion, is a large diameter lens, the lens means may also comprise separate spaced lenses as shown in Fig. 18 described below.

The foregoing has been described primarily for the purpose of giving a better understanding of the features of this invention which are to be described below. The problem of producing full stereoscopic effects by photographic methods is not a simple one and, unless certain principles are followed, the desired stereoscopic effect is not produced or is produced in such a small degree as to be unsatisfactory at least from a commercial point of view.

I have found that it is desirable to maintain a definite relationship between the lens used, the resolving screen used, and the image screen. I have likewise found that, when a camera is changed in focus so as to bring into focus distant objects on the one hand and adjacent objects on the other, the stereoscopic effect in the resulting photographs is decidedly changed for different settings of the camera. If a lens is mounted so as to cast light upon a photographic emulsion through a resolving screen, I have found that the best results are obtained when the area at which the image elements or bands are disposed on the photographic emulsion bears a definite relationship to the dimensions of the elements of the resolving screen. For example, when a resolving screen composed of a plurality of lenticular ridges is employed, it is desirable that the area on the screen of the image elements produced by each lenticular ridge be equal to the diameter of the lenticular ridges. It is a purpose and feature of this invention to afford apparatus whereby this relationship or any other desired relationship can be maintained regardless of changes in the relative position of the photographic emulsion and lens such as result, for example, in changing the focus of the camera. At the same time in preferred construction means are afforded for adjusting the light admitted into the camera and the depth of focus of the camera.

In Figs. 1 and 2, there is shown diagrammatically apparatus whereby some of the results above mentioned can be attained. In Fig. 1 the lens 30 is positioned relative to the photographic emulsion 31 so that an object desired to be photographed is imaged upon the emulsion 31. In this position, the camera is designed to focus upon adjacent objects, for example. Behind the lens 30 are shields 32 which determine the spacing of marginal rays 33 and 34 that pass from the lens 30 and strike photographic emulsion 31 after having passed through a lens 35 of resolving screen 36. When the parts are in the position shown in Fig. 1, it is to be noted that the marginal rays 33 and 34 pass through the lens 35 and fall upon the photographic emulsion 31 so as to cover an area on this emulsion which is of approximately the same width as the diameter of the lens 35.

In Fig. 2, the photographic emulsion 31 and resolving screen 36 have been moved to a position more adjacent the lens 30. This relative movement would be required in order, for example, to bring to a focus on the emulsion 31 an image of more distant objects than the objects which were imaged on emulsion 31 when the parts were in the relative positions shown in Fig. 1. With the parts in this position, the marginal rays passing through the lens 35, and emanating from the same portions of the lens 20 as the marginal rays 33 and 34 in Fig. 1, would pass through the lens 35 at a greater angle with respect to each other and would fall upon photographic emulsion at positions outside of the area of emulsion 31 having a width corresponding to the diameter of the lens 35. These rays are shown in dotted lines 33' and 34' in Fig. 2. In Fig. 2, it will be noted, however, that the shields 32 have been moved relatively to the lens 30 and in their new position control the marginal rays 37 and 38 so that the rays 37 and 38 fall upon the resolving screen 36 at approximately the same angle at which rays 33 and 34 fall upon the resolving screen of Fig. 1. Thus, by having a light valve comprising parts such as shields 32, the angle at which marginal rays emerging from a large lens fall upon a photographic emulsion after having passed through a resolving screen may be maintained substantially constant. Thus regardless of the distance from the camera of the object upon which the camera is focused, the device above described enables one to adjust his camera so as to obtain optimum conditions for securing stereoscopic relief.

An alternate modification is shown in Fig. 13. In this figure the parts correspond to the parts shown in Figs. 1 and 2, the lens and photographic emulsion being in the relative position in which they appear in Fig. 2. However, the shields 32 are in front of the lens 30. The effect of the shields 32 in reducing the working diameter of the lens 30 is the same as when the shields are behind the lens 30 in reducing the angle at which marginal rays from the large lens pass through elements of the resolving grating.

A camera in which a light controlling device of the type above mentioned has been incorporated is shown in Figs. 3 and 4. In these figures a camera is shown having a front wall 39 which is rigidly fixed to the base 40. The lens 41 is mounted in a suitable casing 42 attached to the front wall 39. The back 43 of the camera carries the resolving screen and the carrier for the photographic emulsion. For example, a film or plate of the type shown in Fig. 1 may be used having a lenticular front surface and photographic emulsion on the back thereof. Between the front wall 39 and the back wall 43 a conventional bellows 44 is positioned. The back 43 of the camera is slidably mounted on the base 40. Adjacent the lens 41 is an iris 44 of the conventional type the aperture of which is adjustable by actuating member 80. The iris is shown more in detail in Fig. 7. The iris contains a plurality of thin plates 45 which are responsive to rotation of the actuating member 80 to either constrict or expand the aperture which admits light through the lens of the camera so as to fall on the photographic emulsion.

The iris is adapted to be actuated by means interposed between the iris and the back of the camera so that the iris is adjusted responsive to movement of the back of the camera toward or away from the lens. For this purpose the actuating member 80 of the iris is provided with an arm 45ª having a slot 46 therein. A wheel 47 is rotatably mounted on the front of the camera and carries a pin 48 which pin is slidable within the slot 46 so that the rotation of the wheel 47 causes the arm 48 to swing and rotate actuating member 80 of the iris. In order to rotate the wheel 47 when the back of the camera is moved, a cord 49 is employed passing over suitable guide pulleys 50, 51 and 52. A portion of the cord is substantially parallel to the base of the camera and is fixed as by clamp 53 to the back of the camera. By the means just described the movement of the back of the camera in either direction pulls the cord so as to rotate wheel 47 which in turn operates the iris. The arrangement is such that when the back of the camera is moved toward the lens the aperture of the iris is reduced and such that when the back of the camera is moved away from the lens the aperture of the iris is increased. Moreover, the parts are preferably adjusted so that the marginal rays passing from the camera lens and through the resolving screen on to the photographic emulsion make an angle with respect to each other which is regarded as most desirable for obtaining photographs which may be viewed in stereoscopic relief. With the camera thus adjusted the parts can be readily made so that upon moving the back of the camera so as to change the focus, the aperture in the iris is automatically adjusted so as to maintain the desired angle of marginal rays referred to above for all positions of the back of the camera relative to the lens.

With the arrangement shown in Figs. 3 and 4 it is possible to vary the angle at which marginal rays pass through the elements of the resolving screen while the lens means is at a fixed distance from the photographic emulsion. Thus by loosening the clamp 53 the spacing of the marginal rays can be adjusted without moving the back of the camera until the desired adjustment is secured. Thereafter the clamp 53 can be tightened so as to grip cord 49 and the camera will remain in proper adjustment even though the spacing between the lens and the emulsion is subsequently varied.

An alternate form of means for securing automatic adjustment of an iris, for example, is shown in Fig. 5. In this embodiment of this invention instead of employing the cord and pulley device as shown in Figs. 3 and 4, a wedge-shaped part 54 is used which is slidable in base 40 and is movable with the back 43 of the camera as by means of a rod 55 connecting the wedge-shaped part with the back of the camera. The remaining parts of the camera including the iris, lens, front and back, are the same as the parts described above in connection with Figs. 3 and 4 and are indicated by the same reference characters. The iris is caused to be responsive to the position of the wedge by virtue of a rod 56 slidable through suitable bushings 57 carried by the front of the camera and connecting an arm 58 attached to actuating member 80 with a cam wheel 59 that is yieldably urged against the wedge part 54 by spring 60. With the device shown in Fig. 5 it is apparent that when the back of the camera is moved away from the lens the iris is rotated in one direction. Conversely when the back of the camera is moved toward the lens the iris is moved in the reverse direction. The initial adjustment of the position of wedge 54 can be made by loosening thumb screw 126 which normally engages a portion of rod 55 extending into wedge 54.

A further modification of iris actuating means is shown in Fig. 6. This modification is particularly appropriate for use with camera wherein the back 61 is rigidly mounted and the front 62 is movable in adjusting the focus of the camera. The back 61 of the camera is adapted to carry the resolving screen and the carrier for the photographic emulsion. The rod 56, bushings 57, arm 58, cam wheel 59, spring 60, and actuating member 80, are the same as above described in connection with Fig. 5. In Fig. 6, however, a wedge 63 is secured to base 64 with respect to which the front of the camera is movable. It is apparent that with this arrangement the iris can be made to open when the front of the camera is moved in one direction with reference to the back and can be made to close when the front of the camera is moved in the reverse direction relative to the back of the camera. In order to provide for originally adjusting the camera the wedge 63 can be longitudinally slidable in base 64 and clamped in any desired position by thumb screw 127.

In the usual case it is preferable that the change in diameter of the iris or other light valve vary in direct proportion with the change in the spacing between the lens means and the image screen, that is, for example, if the spacing between the image screen and the nodal point of the lens means is reduced by a certain fraction the diameter of the light valve is reduced by a corresponding fraction. With a wedge of the type shown in Figs. 5 and 6, for example, having a straight but inclined cam surface, this result can be readily produced. It is obvious, however, that with the apparatus of this invention any desired rate of change of the diameter of the light valve in conjunction with the rate of change of the spacing between the lens means and the image screen can be obtained.

In addition to having the iris 44 I have combined therewith in preferable construction a second light valve which is indicated generally by the reference character 65 in Fig. 7 and is exemplified in detail in Figs. 8 and 9. The valve 65 comprises two complementary opaque screens 66 and 66' having laterally extending opposed edges and having engaging members 67 and 67', which members are slidable on rods 68 that in turn are secured to the lens casing 69. The members 67 and 67' are preferably constructed so as to afford grooves 70 in which tongues 71 and 71' are adapted to be guided. The screens 66 and 66' are normally urged toward each other so as to be in contact as shown in solid lines in Fig. 8 by means of pins 72 and 72' attached to members 67 and 67', pins 73 on rods 68, and tension springs 74 between said pins. The screens 66 and 66' can be separated vertically from each other as desired by actuation of actuating member 75 which is attached as by a pin 81 to rotatable part 76 carrying cams 77 and 77'. The screens 66 and 66' carry cam surfaces 78 and 78' so that upon turning of actuating member 75 until the cams 77 and 77' are in the position shown in dotted lines, the screens are gradually separated until they occupy the position shown in dotted lines. It is apparent that upon turning the actuating member in the opposite direction the springs 74 cause the screens 66 and 66' to come together again.

The light valve 65 as combined with the iris light valve 44 is shown in Fig. 10. These light valves are preferably mounted as near as possible to the nodal point of the lens means. The actuating member 75 is rotatable on casing 69 and is preferably calibrated against some scale so that it can be adjusted or readjusted as desired. The iris light valve 44 is likewise controlled by an actuating member 80 which is preferably automatically rotated to control the aperture in the iris as by any of the means shown in Figs. 3, 4, 5 and 6. In connection with the light valves any suitable lens system can be used which may, for example, comprise lenses 81, 82, 83 and 84. The character of the lenses and the manner of their mounting may be any that is desirable for producing an image on a photographic emulsion, and the distance from lens means either simple or compound to the image screen is taken as the distance from the nodal point of the lens means to the image screen.

Instead of combining an iris of the type shown in Fig. 7 with a light valve of the type shown in Figs. 8 and 9, it is possible to employ two light valves of the type shown in Figs. 8 and 9 which two light valves can be set at right angles to each other as shown diagrammatically in Fig. 11. Thus a light valve 65 in which the shields 66 and 66' open vertically are employed. Preferably this light valve is adjustable by hand depending upon the amount of light that it is desired to have admitted into the camera and the depth of focus desired. In addition a second light valve 82 is employed which may be exactly like valve 65 except that it is set at right angles to light valve 65 so that the shields 83 and 83' thereof open horizontally. Preferably light valve 82 is automatically operated through actuating member 84 as by any of the means above described in connection with Figs. 3, 4, 5 and 6.

The devices above described are not only applicable in cameras wherein a lenticular screen is employed as a resolving screen but also applicable when other types of resolving screens are employed. For example, the principles of this invention are applicable when the resolving screen comprises a grating having alternate transparent and opaque portions. In this connection reference is made to Figs. 14 and 15. In these figures a large lens 30 is employed in combination with adjustable shields 32 of the type shown in Figs. 1 and 2. The photographic emulsion 31 is carried by any suitable body 88 such as a glass plate or a photographic film. The resolving screen 85 presents opaque bands 86 having transparent areas 87 therebetween. It may be noted that the marginal rays 33 and 34 passing through an aperture in resolving screen 85 make a definite angle with respect to each other when the lens and photographic emulsion are in the relative position shown in Fig. 14. When the relative position of the lens and emulsion are changed, the marginal rays 37 and 38 can be caused to pass through the apertures in resolving screen 85 at the same angle, for example, that rays 33 and 34 make with each other, by changing the adjustment of screens 32 with reference to lens 30. It is apparent that any desired angle at which marginal rays pass through the resolving screen can be maintained regardless of changes in the relative position of the photographic emulsion and the camera lens.

When a resolving grating is employed the desired width of the sum of the image elements in back of a resolving element may be controlled alternatively by bringing the resolving screen closer to the image screen. Thus if the parts are as above described in connection with Fig. 14 are in the position there shown and it is desired to bring the image screen closer to the lens to the position shown in Fig. 20, the resolving grating can be moved into closer proximity to the emulsion while leaving screens 32 with the same spacing therebetween. In this case the marginal rays 115 and 116 can be spaced on emulsion 31 by the same amount, for example, that rays 33 and 34 were spaced on emulsion 31 when the parts were in the relative positions shown in Fig. 14. To control the varying of the spacing of the resolving screen from the image screen some device such as that shown in Fig. 21 may be used. In this figure the body 88 carrying emulsion 31 is movable with respect to the base 117 of the camera and carries brackets 118 in which rod 119 is rotatable. Rod 119 is rotated responsive to movement of 88 by rack 120 on base 117 and gear 121 fixed to rod 119. By bevel gears 122 rods 123 which are rotatably carried in body 88 are responsive to rotation of rod 119. Rods 123 have threads 124 which are in threaded engagement with resolving screen so that the spacing of resolving screen 85 from body 88 is changed upon rotation of rods 123, responsive to movement of body 88 relative to base 117 in focusing the camera.

In Figures 14 and 15 the resolving screen is separate from the carrier for the photographic emulsion. This may likewise be the case when the resolving screen is of lenticular construction as shown in Fig. 16. In this figure the photographic emulsion 89 is carried by a carrier body 90 such as a plate of glass or a film of cellulosic material. The lenticular screen 91 having lenses 92 is separate from the emulsion 89 and its carrier 90 and may be either spaced therefrom as shown or in juxtaposition therewith. The screen may be of any suitable material such as glass or cellulose ethers or esters, e. g. cellulose acetate.

The foregoing description has particular applicability to resolving screens wherein the resolving elements are vertically disposed. Thus the apparatus above described for controlling the lateral displacement of marginal rays has particular applicability when used with resolving screens having vertically extending lenticular ridges or grating lines. In the normal case vertical resolving elements are used for the problem is normally to produce two views disposed on opposite sides of a vertical plane and bring them exclusively to the left and right eyes. In such event the control of the angle at which marginal rays pass through the resolving screen on a horizontal plane is of primary importance according to this invention. Of course, if for any reason it should be desired to obtain a picture at 90° from the vertical which can be viewed in stereoscopic relief, the whole apparatus can be tilted 90° about its axis, or photographs at any other desired angle can be similarly obtained.

In certain cases it may be desired to obtain photographs which can be viewed from any angle in stereoscopic relief. When this is the case, instead of using lenticular ridges, semi-spherical lenses can be used of the type shown in Fig. 17. The resolving screen 92 has a plurality of semi-spherical lenses 93 thereon. Either a side or top sectional view of such screen will be similar to the top views of the lenticular screens shown in Figs. 1 and 16, for example. It is apparent that no matter how the resulting stereograph is turned about an axis perpendicular thereto it will always remain viewable in stereoscopic relief.

When a resolving screen having semi-spherical lenticular resolving elements is used it is preferable to use an iris of the type shown in Fig. 7 or other light valve means such as that shown in Fig. 11 which controls the angle at which not only laterally disposed marginal rays but also the vertically disposed marginal rays pass through the elements of the resolving screen. If the iris is used this is all that is required to give the necessary control and the aperture of iris is preferably in such case automatically controlled, depending on the focus of the camera, the control being such that the aperture of the iris changes so as to produce maximum stereoscopic effect no matter how the camera is focussed. If the two light valves are used as shown in Fig. 11 they can both be actuated automatically upon changing the focus of the camera.

The foregoing description has been given primarily in connection with means for controlling the working diameter of a wide diameter lens. This invention is not limited to such construction but is applicable, for example, when a binocular camera is used of the type shown in Fig. 18. In the drawings, a binocular camera is shown having two lenses 94 and 94'. Light passing through these lenses falls on photographic emulsion 95 after having passed through prisms 96 and 96' which bring the images produced by lenses 94 and 94' to a common focus. A composite stereogram is produced by resolving screen 97, which may be of lenticular construction as shown or a grating.

When the parts of the apparatus are in the position shown in solid lines in Fig. 18, the resolving screen is of such character that the marginal rays 98 and 99 pass through elements thereof at an angle with respect thereto which is particularly desirable for producing maximum stereoscopic relief. If it is desired to change the relative distance between the plane of the lenses and the photographic emulsion, the angle at which marginal rays pass through the elements of the resolving screen can be controlled as by altering the spacing of lenses 94 and 94'. Thus, for example, if the resolving screen 97 and emulsion 95 are brought to the position shown in dotted lines in Fig. 18, the lenses 94 and 94' can be brought closer together by any suitable means. Thus lenses 94 and 94' can be mounted on arms 100 and 100'. Likewise prisms 96 and 96' are mounted on arms 106 and 106'. A wheel 101 is rotatably mounted on the front of the camera and is operably connected to rod 102 as by means of bevel gears 103 and 104. The rod 102 is operatively connected so as to move arms 100 and 100' and arms 106 and 106' by suitable gearing indicated generally as 105 and 105'. Thus, for example, in gearing 105, there may be used internally threaded members 140 and 141 which are secured by rods 106 and 100 respectively and which are in threaded engagement with threaded portions 142 and 143 respectively of rod 102. A similar arrangement including members 140' and 141' in threaded engagement with threaded portions 142' and 143' of rod 102 may be used in gearing 105'. Upon turning the wheel 101 in one direction, the lenses 94 and 94' can be moved toward each other as when moving the photographic film nearer the lenses and vice versa. The prisms are likewise moved to maintain the images produced by the lenses at a common focus. The wheel 101 can be operated manually or automatically. It may be operated automatically as by the apparatus shown in Figs. 3 and 4 by substituting the wheel 101 for the wheel 47 shown in Figs. 3 and 4. Other means, such as those hereinabove described, for making automatic adjustment may also be employed.

In addition to means for controlling the spacing of lenses 94 and 94', the amount of light admitted thereby and the depth of focus thereof may be controlled by light valves such as irises 125 and 125' of adjustable diameter. Preferably, the apertures of these irises are adjustable independently of the means for adjusting the spacing of the lenses 94 and 94'.

In the normal case, it is preferable to have the means for adjusting the angle at which marginal rays pass through an element of the resolving screen, controlled automatically by suitable means such as the means above described interposed between the lens and the carrier for the photographic film, so that, upon relative movement between the emulsion and lens, the camera will be maintained in proper adjustment for obtaining maximum stereoscopic effects. However, automatic control is not regarded as essential, as the adjustment can be achieved manually especially with the aid of suitably calibrated scales such as those indicated in Fig. 19. For purposes of illustration, a camera of the type shown in Fig. 5 is shown in Fig. 19 including the base 40, the front 39, the back 43 and block 54 which is movable relative to the base 40 in response to change in spacing between the front 39 and the back 43 of the camera. The block 54 carries an arrow or other marker 108 and adjacent thereto on the base 40 there is a calibrated scale 109 having any scale of numbering such as from one to twenty, for example. The camera carries a lens and light valve arrangement such as that shown in Fig. 10, only instead of having the actuating member 80 controlled automatically, the same may be adjusted by hand. The actuating member is shown presenting an arrow 110 or other marker, and on the lens casing 69 is a suitably calibrated scale 111 which, like the scale 109, may be numbered from one to twenty, for example. The scales can be such that, when the camera is set in proper focus, the light valve controlled by 80 can be set by placing the arrow 110 opposite a point on the scale 111 corresponding to the point that arrow 108 falls on scale 109. The actuating member 75 of the other light valve can also be provided with a marker 113 which reads against the scale 112 so as to aid in arriving at the proper setting of the light valve controlled by the actuating member.

The light valves above described may be employed not only in cameras of the type wherein either the front or the back are movable as shown in Figs. 3, 4, 5 and 6, but also in other types of cameras such as the type shown in Fig. 22 wherein the lens mounting is movable relative to the front of the camera. In such case, the front and back of the camera may be rigidly spaced from each other and the lens means moved relatively to the front of the camera in adjusting the distance between the image screen at the back of the camera and the nodal point of the lens. In this figure, a lens mounting of the type shown in Figs. 10 and 19 may be employed having the casing 69 and the actuating members 80 and 75 for controlling the light valves. The member 80 has a marker 110 reading against scale 111 and the member 75 has a marker 113 reading against scale 112. In the front 130 of the camera, a sleeve 131 is fixed by any suitable means such as screws 132. The rear end of casing 69 is equipped with the tubular part 133 and between part 133 and sleeve 131 is an intermediate sleeve 134 that is rotatably mounted with respect to sleeve 131 and part 133. Secured to part 133 is a pin 135 passing through slot 136 in sleeve 131 and cam slot 136' in sleeve 134. The sleeve 134 has actuating member 137, and by actuating this member to turn sleeve 134, the casing 69 can be caused to be moved in and out with reference to the front 130 of the camera and with reference to an image screen (not shown) at the back of the camera in focusing the lens of the camera on the image screen. The pin 135 in slot 136 prevents the rotation of casing 69. The actuating member 137 can present a marker 138 readable against a scale 139 on stationary sleeve 131 to aid in adjusting and readjusting the focus. The scale 111 can be used in adjusting the diameter of the light valve to correspond to changes in the focus produced by rotating actuating member 137. This may be done manually as described in connection with Fig. 19. Automatic adjustment is also possible as by connecting the actuating members 137 and 80 by one or more bars 140 so that these members will rotate together to both change the focus of the camera and make a desired change in the spacing of marginal rays passing through elements of a resolving screen. Other types of light valve control in cameras focused by moving the lens means relative to the front of the camera may also be employed in the practice of this invention.

This invention has been described in connection with certain specific embodiments thereof, but it is to be understood that this has been done for illustrative purposes only without limitation on the scope of this invention. Moreover, hereinabove reference has been made to the employment of a photographic emulsion, but it is believed to be apparent that any image screen may be substituted for a photographic emulsion and that a photographic emulsion is used for illustrative purposes only. Thus a fluorescent material or even an electrical or mechanical scanning device could be used at a physical or aerial image which would then be the image screen. Various forms of resolving screens have been illustrated and it has been pointed out that the resolving screen may be integral with or separate from the image screen. Preferably, however, the resolving screen is carried in predetermined relation to the image screen at a desired fixed distance therefrom. The lens structures used in cameras are of many types and any type of lens structure may be used in the practice of this invention. Likewise the light valves and controls therefor may take many different forms.

I claim:

1. Apparatus for making a composite stereograph which comprises lens means, an image screen, a resolving screen containing a plurality of resolving elements, and adjustable means adapted to vary the angle at which marginal rays from said lens means pass through the elements of said resolving means and onto said image screen.

2. Apparatus for making a composite stereograph which comprises an image screen, lens means adapted to receive spaced views and image them on said image screen from different angles, a resolving screen between said lens means and said image screen having a plurality of resolving elements adapted to resolve the spaced views into image elements, the image elements of one view being separate from the image elements of the other view, and means for varying the total width of the sum of the image elements produced by each resolving element.

3. Apparatus for making a composite stereograph which comprises an image screen, lens means adapted to receive spaced views and image said views on said image screen from different angles, said lens means and image screen being mounted for relative movement with respect to the spacing therebetween, a resolving screen having a plurality of resolving elements adapted to resolve the spaced views into image elements, the image elements of one view being separate from the image elements of the other, and adjustable control means adapted to vary the spacing of the marginal rays of said spaced views emanating from said lens means and passing through resolving elements of said resolving screen.

4. Apparatus for making a composite stereograph which comprises lens means, an image screen, a resolving screen containing a plurality of resolving elements, and adjustable means adapted to vary the angle at which the marginal rays of said spaced views pass through elements of said resolving screen onto said image screen so that said angle can be maintained substantially uniform upon varying the spacing between said lens means and said image screen.

5. Apparatus for making a composite stereograph which comprises an image screen, lens means adapted to receive spaced views and image them on said image screen from different angles, said lens means and image screen being mounted for relative movement with respect to the spacing therebetween, a resolving screen between said lens means and said image screen having a plurality of resolving elements adapted to resolve the spaced views into image elements, the image elements of one view being separate from the image elements of the other view, and means which is responsive to relative movement between said image screen and said lens means and which is adapted to maintain the total width of the sum of the image elements produced by each resolving element substantially the same upon varying the spacing between said lens means and said image screen.

6. Apparatus for making a composite stereograph which comprises an image screen, lens means adapted to receive spaced views and image said views on said image screen from different angles, said lens means and image screen being mounted for relative movement with respect to the spacing therebetween, a resolving screen having a plurality of resolving elements adapted to resolve the spaced views into image elements, the image elements of each view being separate from each other, adjustable means adapted to vary the spacing of the marginal rays of said spaced views emanating from said lens means and passing through elements of said image screen, and means which is responsive to movement of said image screen relative to said lens means and is adapted to reduce the spacing of said marginal rays when said image screen is moved toward said lens means and to increase the spacing of said marginal rays when said image screen is moved away from said lens means.

7. Apparatus for making a composite stereograph which comprises an image screen, lens means adapted to receive spaced views of an object and image them on said image screen from different angles, said lens means and said image means being mounted for relative movement with respect to the spacing therebetween, a resolving screen between said lens means and said image screen having a plurality of resolving elements adapted to resolve said views into image elements, the elements of one view being separate from the elements of the other view, adjustable means adapted for varying the angle at which marginal rays from said lens means pass through elements of said resolving screen when the said image screen is at a fixed distance from said lens means, and means responsive to varying the spacing between said image screen and said lens means for actuating said adjustable means to maintain said angle approximately the same upon varying the spacing between said image screen and said lens means.

8. Apparatus for making a composite stereograph which comprises an image screen, lens means adapted to receive spaced views and image said views on said image screen from different angles, said lens means and said image screen being mounted for relative movement with respect to the spacing therebetween, a resolving screen having a plurality of resolving elements adapted to resolve the spaced views into image elements, the elements of each view being separate from the other, means adapted to vary the angle at which the marginal rays of said spaced views pass through elements of said resolving screen onto said image screen, and means which is responsive to movement of said image screen relative to said lens means and is adapted to maintain the angle between the aforesaid rays of said spaced views substantially uniform for different spacings between said lens means and said image screen.

9. Apparatus for making a composite stereograph which comprises an image screen, lens means adapted to receive spaced views and image said views on said image screen from different angles, said lens means and said image screen being mounted for relative movement with respect to the spacing therebetween, a resolving screen having a plurality of resolving elements adapted to resolve the spaced views into image elements, the image elements of each view being separate from the other, and an adjustable light valve adapted to vary the angle at which marginal rays of said spaced views pass through elements of said resolving screen onto said image screen.

10. Apparatus for making a composite stereograph which comprises an image screen, lens means adapted to receive spaced views and image said views on said image screen from different angles, said lens means and said image screen being mounted for relative movement with respect to the spacing therebetween, a resolving screen having a plurality of resolving elements adapted to resolve the spaced views into image elements, the image elements of each view being separate from the other, an adjustable light valve adapted to vary the angle at which marginal rays of said spaced views pass through elements of said resolving screen onto said image screen, and means which is responsive to movement of said image screen relative to said lens means and which is adapted to adjust said light valve so as to maintain the angle at which marginal rays of said spaced views pass through said elements of said resolving screen onto said image screen substantially uniform upon movement of said image screen relative to said lens means.

11. Apparatus for making a composite stereograph which comprises an image screen, a lens having a diameter of at least about 2½ inches, which lens is adapted to form an image on said image screen, said lens and said image screen being mounted for relative movement with respect to the spacing therebetween, a resolving screen having a plurality of resolving elements adapted to resolve light received by different parts of said lens and imaged on said image screen into a plurality of individual image elements, and an adjustable light valve for varying the working diameter of said lens.

12. Apparatus for making a composite stereograph which comprises an image screen, a lens having a diameter of at least about 2½ inches, which lens is adapted to form an image on said image screen, said lens and said image screen being mounted for relative movement with respect to the spacing therebetween, a resolving screen having a plurality of resolving elements adapted to resolve light received by different parts of said lens and imaged on said image screen into a plurality of individual image elements, an adjustable light valve for varying the working diameter of said lens, and means which is responsive to relative movement between said lens and said image screen and which is adapted to actuate said light valve to vary the working diameter of said lens so as to maintain the angle between said marginal rays passing through points on said resolving screen onto said image screen substantially the same when said image screen is at different distances from said lens.

13. Apparatus for making a composite stereograph which comprises an image screen, a lens having a diameter of at least about 2½ inches adapted to form an image on said image screen, a resolving screen adapted to resolve light from different sides of the center vertical axis of said lens into a plurality of individual vertically extending image elements on said image screen, a first adjustable light valve adapted to adjust the lateral working diameter of said lens, and a second light valve which is independently adjustable with respect to said first light valve and which is adapted to control vertical working diameter of said lens.

14. Apparatus for making a composite stereograph which comprises an image screen, a lens having a diameter of at least about 2½ inches adapted to form an image on said image screen, a resolving screen adapted to resolve light from different sides of the center vertical axis of said lens into a plurality of individual vertically extending image elements on said image screen, a first adjustable light valve adapted to adjust the lateral working diameter of said lens, a second light valve which is independently adjustable with respect to said first light valve and which is adapted to control vertical working diameter of said lens, and means which is responsive to relative movement between said image screen and said lens and which is adapted to actuate said first light valve to decrease the working diameter of said lens when said image screen is moved toward said lens and to increase the working diameter of said lens when said image screen is moved away from said lens.

15. Apparatus for making a composite stereograph which comprises an image screen, lens means adapted to receive spaced views and image said views on said image screen from different angles, said lens means and said image screen being mounted for relative movement with respect to the spacing therebetween, a resolving screen having a plurality of lenticular resolving elements adapted to resolve said spaced views onto a plurality of image elements, the elements of one view behind each lenticular element being separate from the elements of other views, and adjustable means adapted to vary the angle at which marginal rays strike each of said lenticular elements so that the total width of the sum of said image elements behind a lenticular element is approximately the same as the width of said lenticular element at different spacings between said image screen and said lens means.

16. Apparatus for making a composite stereograph which comprises an image screen, lens means adapted to receive spaced views and image said views on said image screen from different angles, said lens means and said image screen being mounted for relative movement with respect to the spacing therebetween, a resolving screen having a plurality of lenticular resolving elements adapted to resolve said spaced views onto a plurality of image elements, the elements of one view behind each lenticular element being separate from the elements of other views, adjustable means adapted to vary the angle at which marginal rays strike each of said lenticular elements so that the total width of the sum of said image elements behind a lenticular element is approximately the same as the width of said lenticular element at different spacings between said image screen and said lens means, and means responsive to movement of said image screen relatively to said lens means for automatically adjusting said adjustable means.

17. Apparatus for making a composite stereograph which comprises a lens having a diameter of at least about 2½ inches, a carrier having a photographic emulsion on one side thereof and vertically extending lenticular ridges on the other side thereof between said lens and said photographic emulsion, and an adjustable light valve for adjusting the lateral extent of the working diameter of said lens.

18. Apparatus for making a composite stereograph which comprises an objective lens having a diameter of at least about 2½ inches, a carrier for a photographic emulsion, a lenticular resolving screen having a plurality of semi-spherical lenses between said objective lens and said photographic emulsion, and light valve means adapted to control the lateral and vertical extent of the working diameter of said lens.

19. Apparatus for making a composite stereograph which comprises an image screen, a pair of laterally spaced lenses adapted to bring an image to a substantially common focus on said image screen, said lenses and said image screen being mounted for relative movement with respect to the spacing therebetween, a resolving screen interposed between said lenses and said image screen, and means adapted to vary the distance between said lenses.

20. Apparatus for making a composite stereograph which comprises an image screen, a pair of laterally spaced lenses adapted to bring an image to a substantially common focus on said image screen, said lenses and said image screen being mounted for relative movement with respect to the spacing therebetween, a resolving screen interposed between said lenses and said image screen, means adapted to vary the distance between said lenses, and means adapted to vary the working diameter of said lenses.

21. Apparatus for making a composite stereograph which comprises an image screen, a lens having a diameter of at least about 2½ inches spaced from said lens, a resolving screen between said lens and said image screen, an adjustable light valve adjacent said lens adapted to vary the working diameter of said lens, an actuating member operatively connected to said light valve, a part movable relatively to said actuating member responsive to variations in the spacing between said lens and said image screen, and means interposed between said part and said actuating member adapted to operate said actuating member so that the opening of said light valve varies in direct proportion to the spacing between said image screen and said lens.

22. Apparatus for making a composite stereograph which comprises an image screen, a lens having a diameter of at least about 2½ inches, a resolving screen between said lens and said image screen, light valve including a pair of shields having laterally extending opposed edges, and means adapted to vary the spacing of said edges from each other.

23. Apparatus for making a composite stereograph which comprises an image screen, a lens having a diameter of at least about 2½ inches, a resolving screen between said lens and said image screen, light valve including a pair of shields having laterally extending opposed edges, means adapted to vary the spacing of said edges from each other, and means adapted to vary the lateral extent of the opening between said edges.

DOUGLAS FREDWILL WINNEK COFFEY.